United States Patent
Pawlowski

(10) Patent No.: US 9,380,190 B2
(45) Date of Patent: Jun. 28, 2016

(54) ROTATING LENS APPARATUS

(71) Applicant: Gentex Corporation, Zeeland, MI (US)

(72) Inventor: Timothy L. Pawlowski, West Olive, MI (US)

(73) Assignee: GENTEX CORPORATION, Zeeland, MI (US)

( * ) Notice: Subject to any disclaimer, the term of this patent is extended or adjusted under 35 U.S.C. 154(b) by 117 days.

(21) Appl. No.: 13/959,779

(22) Filed: Aug. 6, 2013

(65) Prior Publication Data

US 2014/0036132 A1    Feb. 6, 2014

Related U.S. Application Data

(60) Provisional application No. 61/679,944, filed on Aug. 6, 2012.

(51) Int. Cl.
| | |
|---|---|
| *H04N 5/217* | (2011.01) |
| *H04N 5/225* | (2006.01) |
| *B60R 11/04* | (2006.01) |
| *B60S 1/08* | (2006.01) |
| *G03B 17/02* | (2006.01) |
| *G03B 17/56* | (2006.01) |

(52) U.S. Cl.
CPC .............. *H04N 5/2171* (2013.01); *B60R 11/04* (2013.01); *B60S 1/0848* (2013.01); *G03B 17/02* (2013.01); *G03B 17/568* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 3,659,307 A * | 5/1972 | Vitou | B60S 1/603 15/250.002 |
| 5,068,770 A * | 11/1991 | Baziuk | B60Q 1/0005 15/250.01 |
| 5,177,606 A | 1/1993 | Koshizawa | |
| 7,078,846 B2 | 7/2006 | Tsukui et al. | |
| 7,726,434 B2 | 6/2010 | Pöchmüller | |
| 7,965,336 B2 | 6/2011 | Bingle et al. | |
| 2001/0022627 A1* | 9/2001 | Bernhardt | 348/373 |
| 2002/0152573 A1 | 10/2002 | Tsukui et al. | |
| 2005/0206511 A1* | 9/2005 | Heenan | B60S 1/0822 340/438 |
| 2006/0232670 A1 | 10/2006 | Chu | |
| 2007/0223899 A1 | 9/2007 | Snow | |
| 2010/0225753 A1* | 9/2010 | Karasawa et al. | 348/65 |
| 2010/0249503 A1* | 9/2010 | Yazawa et al. | 600/109 |
| 2011/0249120 A1 | 10/2011 | Bingle et al. | |
| 2011/0266375 A1 | 11/2011 | Ono et al. | |
| 2011/0292212 A1 | 12/2011 | Tanabe et al. | |
| 2012/0000024 A1 | 1/2012 | Layton | |

FOREIGN PATENT DOCUMENTS

JP        06121204 A * 4/1994 ............. H04N 5/225

* cited by examiner

*Primary Examiner* — Timothy J Henn
*Assistant Examiner* — Quan Pham
(74) *Attorney, Agent, or Firm* — Price Heneveld LLP; Scott P. Ryan

(57) ABSTRACT

A lens cleaning device having a housing. A cylindrical lens is disposed inside the housing and defines an inner cavity. An imager is disposed in the cavity. A gear assembly operably couples the cylindrical lens with a motor. The motor is operational to rotate the gear assembly and consequently the cylindrical lens.

13 Claims, 7 Drawing Sheets

ROTATING LENS APPARATUS

CROSS-REFERENCE TO RELATED APPLICATION

This application claims priority to and the benefit under 35 U.S.C. §119(e) of U.S. Provisional Patent Application No. 61/679,944, entitled "ROTATING LENS APPARATUS," filed Aug. 6, 2012, the entire disclosure of which is incorporated herein by reference.

BACKGROUND OF THE INVENTION

The present invention generally relates to a lens apparatus, and more specifically to a rotating lens apparatus for a lens cleaning device.

SUMMARY OF THE PRESENT INVENTION

One aspect of the present invention includes a lens cleaning device having a housing. A cylindrical lens is disposed inside the housing and defines an inner cavity. An imager is disposed in the cavity. A gear assembly operably couples the cylindrical lens with a motor. The motor is operational to rotate the gear assembly and consequently the cylindrical lens.

Another aspect of the present invention includes a rotating lens apparatus having a housing. A lens is disposed inside the housing and includes a cylindrical wall defining an inner cavity. A wiping assembly is in contact with an outer circumference of the lens. An imager is disposed in the cavity and includes a field of view that extends through the cylindrical wall of the lens. A gear assembly operably couples the cylindrical lens with a motor. The motor is operational to rotate the gear assembly and consequently the cylindrical lens.

Another aspect of the present invention includes a lens cleaning device having a housing. A lens is disposed inside the housing and includes a cylindrical wall defining an inner cavity. A first wiping assembly is in contact with an outer circumference of the lens, and a second wiping assembly is in contact with an outer circumference of the lens. An imager is disposed in the cavity, and includes a field of view that extends through the cylindrical wall of the lens. A gear assembly operably couples the cylindrical lens with a motor. The motor is operational to rotate the gear assembly and consequently the cylindrical lens. A fluid delivery system delivers a washing fluid to the lens.

The present concept includes a lens apparatus that protects and seals an imager, and is self-cleaning during use. The lens apparatus as described herein allows the imager to continue to capture clear images despite the presence of adverse environmental conditions including dust or moisture which would normally be detrimental to an imager or to the collection of clear images. Thus, the lens apparatus allows the imager to be effectively used in outdoor and mobile applications, such as on a vehicle.

These and other aspects, objects, and features of the present invention will be understood and appreciated by those skilled in the art upon studying the following specification, claims, and appended drawings.

DETAILED DESCRIPTION OF EMBODIMENTS

Figure 1:
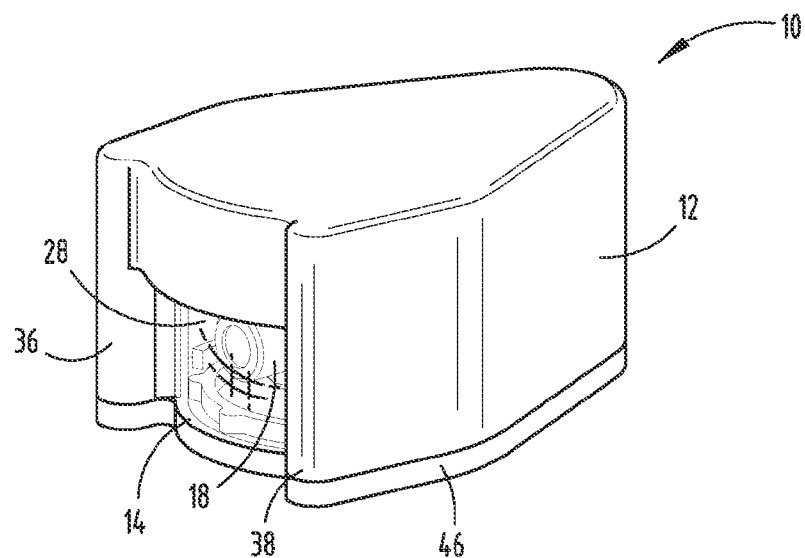
FIG. 1 is a top perspective view of one embodiment of a lens cleaning device of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The disclosure herein generally relates to a rotating lens cleaning device. Lens cleaning devices are generally known, and examples of such devices are described in U.S. patent application Ser. No. 13/428,799, entitled "LENS CLEANING APPARATUS," filed Mar. 23, 2012; U.S. patent application Ser. No. 13/557,070, entitled "IMAGING DEVICE PROTECTOR AND CLEANER," filed Jul. 24, 2012; U.S. Provisional Patent Application Ser. No. 61/678,903, entitled "AMPLIFIED PIEZOELECTRIC CAMERA LENS CLEANER," filed Aug. 2, 2012; and U.S. Provisional Patent Application Ser. No. 61/785,654, entitled "LIGHT SENSING DEVICE," filed Mar. 14, 2013, all of which are hereby incorporated by reference in their entirety.

Figure 2:
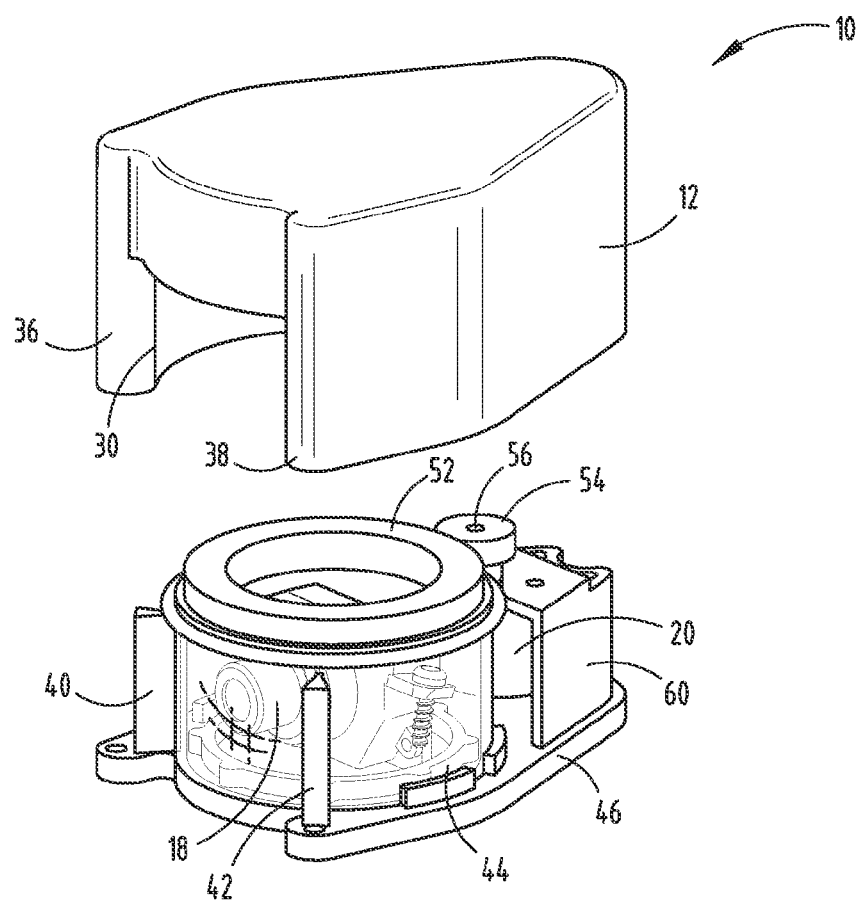
FIG. 2 is a top perspective view of the lens cleaning device of FIG. 1 with the housing removed.
Figure 3:
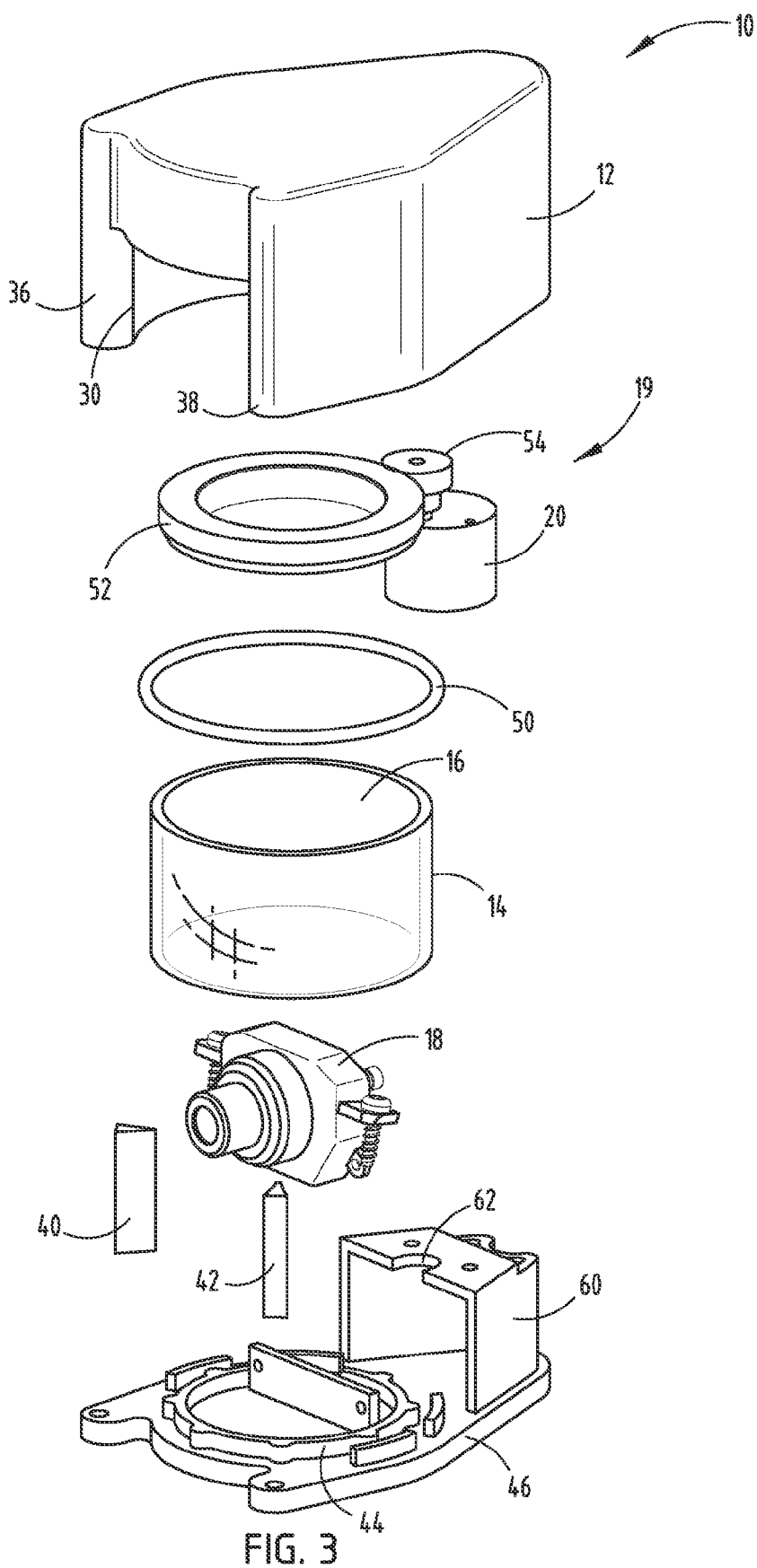
FIG. 3 is a top perspective exploded view of the lens cleaning device of FIG. 1.

Reference will now be made in detail to the present embodiments, examples of which are illustrated in the accompanying drawings. Referring to FIGS. 1-3, reference numeral 10 generally designates a lens cleaning device having a housing 12. A cylindrical lens 14 is disposed inside the housing 12 and defines an inner cavity 16. An imager 18 is disposed in the inner cavity 16. A gear assembly 19 operably couples the cylindrical lens 14 with a motor 20. The motor 20 is operational to rotate the gear assembly 18, and consequently the cylindrical lens 14.

Referring again to FIGS. 1-3, the housing 12 of the lens cleaning device 10 generally defines an assembly space 28 and a forward opening 30 in the form of a viewing window for the imager 18. The viewing window is also configured to generally accommodate a forward portion of the cylindrical lens 14. In addition, the housing 12 includes first and second forward projections 36, 38 adapted to receive and protect first and second wiping members 40, 42 that are disposed on each side of the viewing window of the housing 12. As shown in the embodiment depicted in FIGS. 1-3, the forward projections 36, 38 are adjacent the forward opening 30. The cylindrical lens 14 is supported inside a circular slot 44 in a base 46 of the lens cleaning device 10. The circular slot 44 allows for rotation of the cylindrical lens 14 inside the housing 12. A gasket 50 is disposed above the cylindrical lens 14 and seals the assembly space 28, as well as the inner cavity 16, from the environment. The housing 12 extends downwardly to the base, to enclose the cylindrical lens 14, as well as the imager 18 and gear assembly 19.

Referring again to FIGS. 1-3, the gear assembly 19 includes an open gear 52, which is positioned above the gasket 50, and is operably coupled with the cylindrical lens 14. The open gear 52 is connected with a drive gear 54 that is fixedly connected with a drive shaft 56 that extends into the motor 20. The motor 20 is operable between activated and deactivated conditions, which can be selected by a user, or automatically initiated based on predefined activation criteria. The imager 18 is disposed inside the inner cavity 16 of the cylindrical lens 14. The imager 18 is designed to capture images or video through the forward opening 30 and through the cylindrical lens 14. The motor 20, as illustrated, is positioned in an enclosure 60 disposed in the assembly space 28 of the housing 12. The enclosure 60 includes a slot 62 configured to accommodate the drive shaft 56, which extends through the slot 62. The top of the drive shaft 56 is coupled with the drive gear 54, which engages the open gear 52. Activation of the motor 20 causes the drive shaft 56, and consequently the drive gear 54, to rotate. Rotation of the drive gear 54 causes rotation of the open gear 52, which also causes rotation of the cylindrical lens 14 in the circular slot 44. As the cylindrical lens 14 rotates, the first and second wiping members 40, 42, which are in abutting contact with an outer surface of the cylindrical lens 14, remove dust and debris from the cylindrical lens 14. The first and second wiping members 40, 42 maintain a static position inside the housing 12. As the cylindrical lens 14 rotates, debris is removed, thereby providing a clear area on the cylindrical lens 14 through which images and video can be captured by the imager 18.

Figure 4:
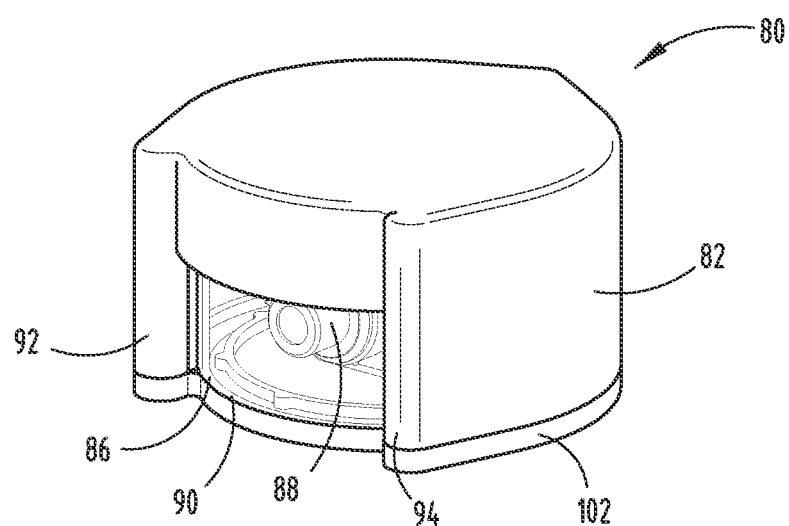
FIG. 4 is a top perspective view of another embodiment of a lens cleaning device of the present invention.
Figure 5:
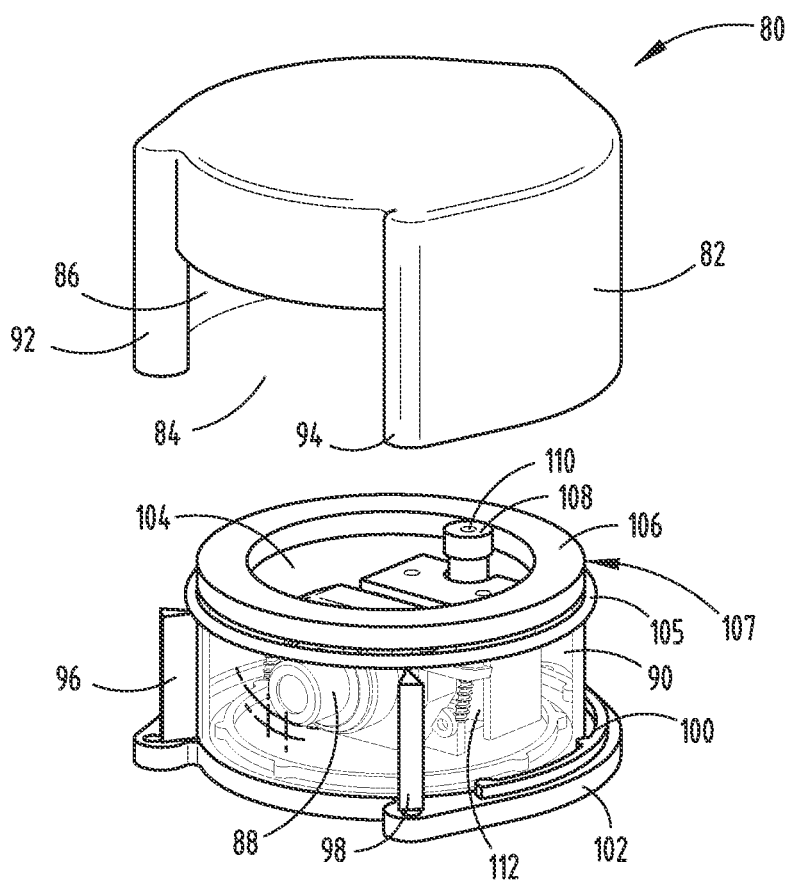
FIG. 5 is a top perspective view of the lens cleaning device of FIG. 4 with the housing removed.
Figure 6:
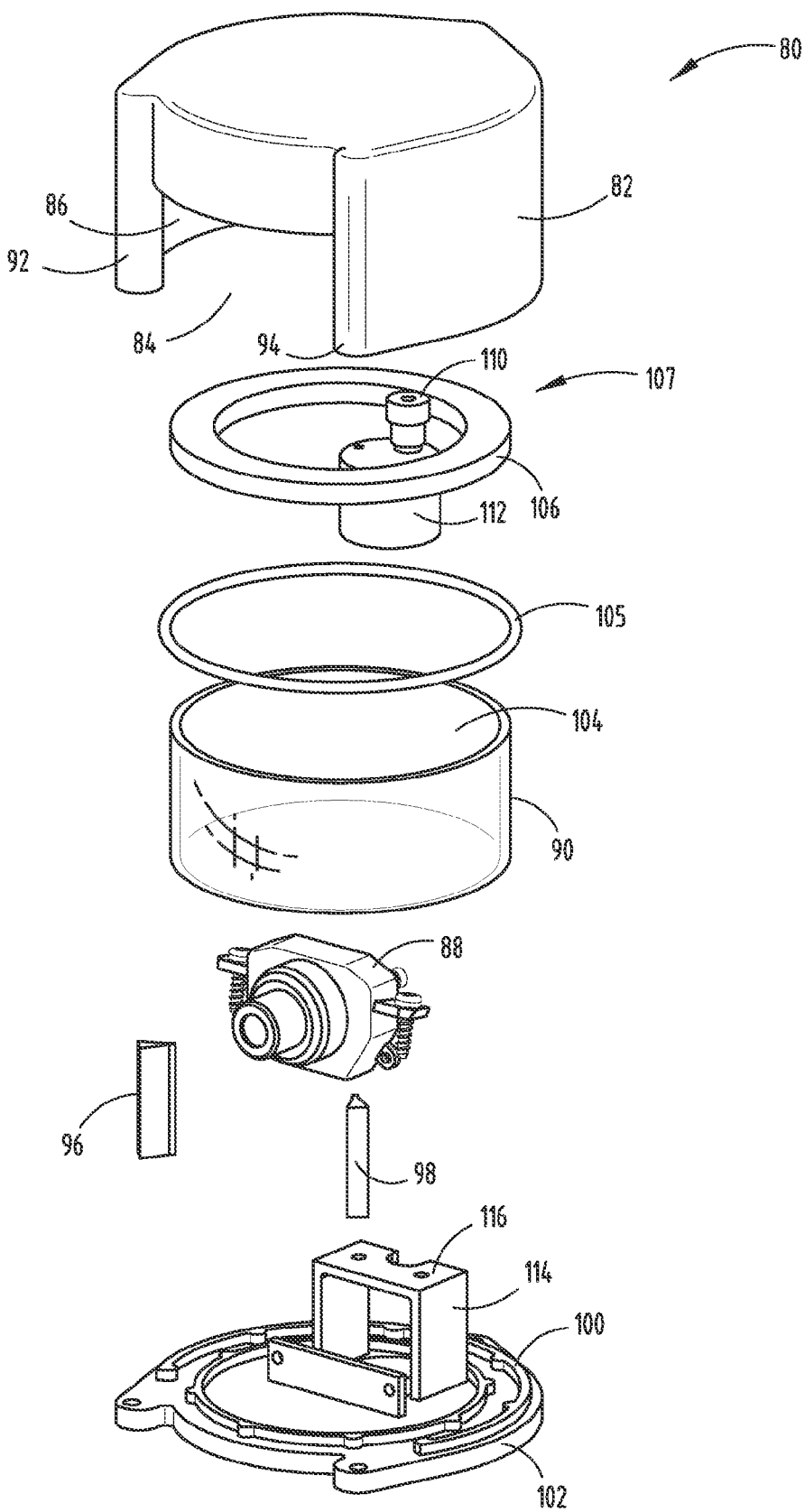
FIG. 6 is a top perspective exploded view of the lens cleaning device of FIG. 4.

Referring now to FIGS. 4-6, in another embodiment of the present invention, a lens cleaning device 80 includes a housing 82 that generally defines an assembly space 84 and a forward opening 86 configured to provide a viewing window for an imager 88. The viewing window is also configured to generally accommodate a forward portion of a cylindrical lens 90 of the lens cleaning device 80. The housing 82 includes first and second forward protuberances 92, 94 adapted to receive and protect first and second wiping members 96, 98 that are disposed on either side of the viewing window of the housing 82. The cylindrical lens 90 is supported inside a circular slot 100 in a base 102 of the lens cleaning device 80. The circular slot 100 allows for rotation of the cylindrical lens 90 inside the housing 82. The cylindrical lens 90 defines an inner cavity 104. A gasket 105 is disposed on the cylindrical lens 90 and seals the assembly space 84 from the environment. A gear assembly 107 is located in the housing 82 and includes an open gear 106 positioned above the gasket 105 and is operably coupled with the cylindrical lens 90. The open gear 106 is connected with a drive gear 108 that is fixedly connected with a drive shaft 110 that extends into a motor 112. Unlike the previous embodiment, the motor 112 is not disposed in an enclosure. Rather, the motor 112 is disposed inside the inner cavity 104 with the imager 88. The motor 112 is operable between activated and deactivated conditions, which can be selected by a user, or automatically initiated by certain predetermined conditions. The imager 88 is configured to capture images and video through the forward opening 86 and the cylindrical lens 90.

The cylindrical lens 90 shown in FIGS. 4-6 is slightly larger than that of the previously discussed embodiment to accommodate both the imager 88 and the motor 112. The motor 112 is located in an enclosure 114 with a slot 116 and generally operates in a similar manner to the previous embodiment. Activation of the motor 112 causes the cylindrical lens 90 to rotate and disengagement of the motor 112 causes the cylindrical lens 90 to stop. Activation of the motor 112 causes the drive shaft 110, and consequently the drive gear 108, to rotate. Rotation of the drive gear 108 causes rotation of the open gear 106, which rotates the cylindrical lens 90 at the same rate. As the cylindrical lens 90 rotates, the first and second wiping members 96, 98, which are in abutting contact with an external wall of the cylindrical lens 90, remove dust and debris from the cylindrical lens 90. The first and second wiping members 96, 98 maintain a static position inside the housing 82. As the cylindrical lens 90 rotates, debris is removed, thereby providing a clear area of the cylindrical lens 90 through which images and video can be captured by the imager 88.

Figure 7:
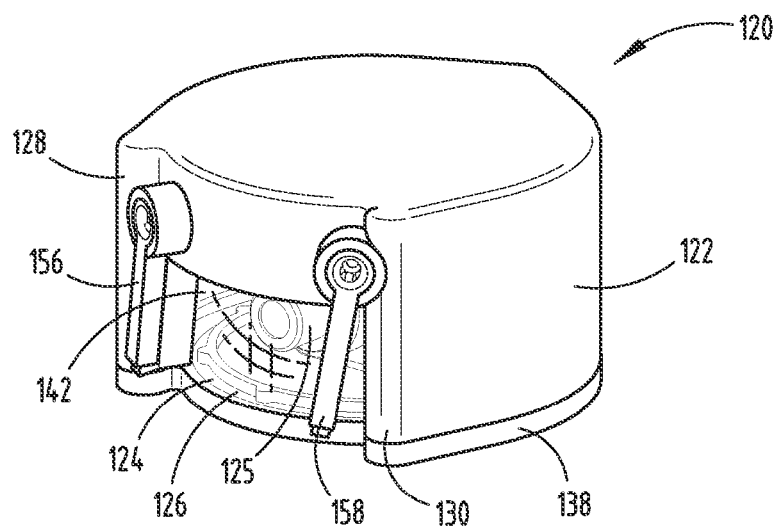
FIG. 7 is a top perspective view of another embodiment of a lens cleaning device of the present invention.
Figure 8:
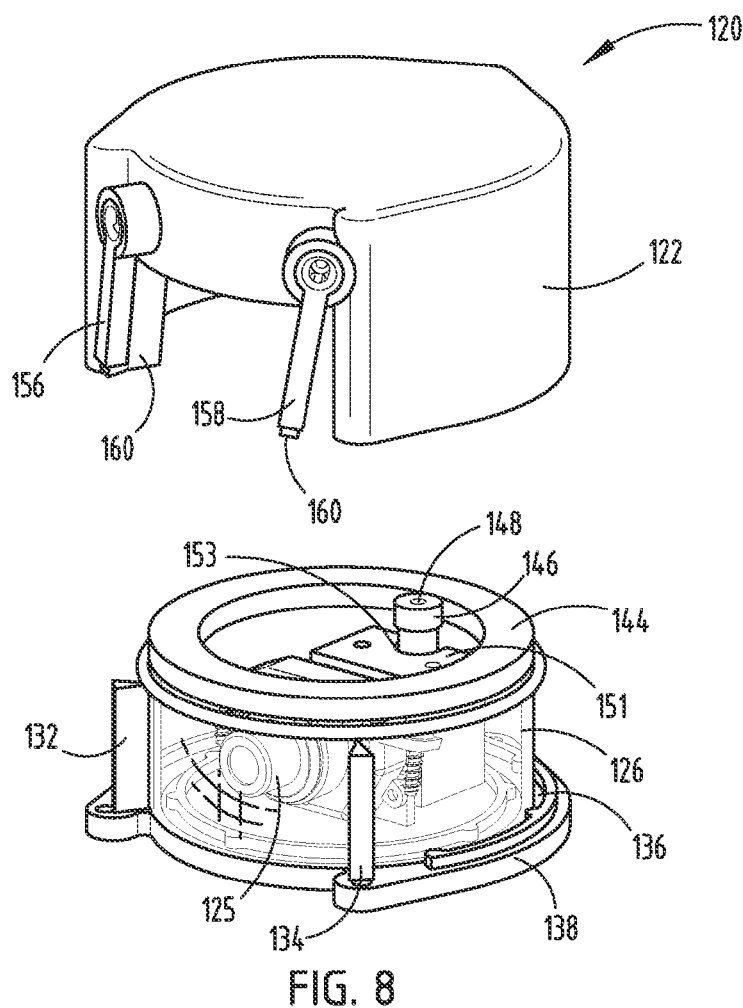
FIG. 8 is a top perspective view of the lens cleaning device of FIG. 7 with the housing removed.
Figure 9:
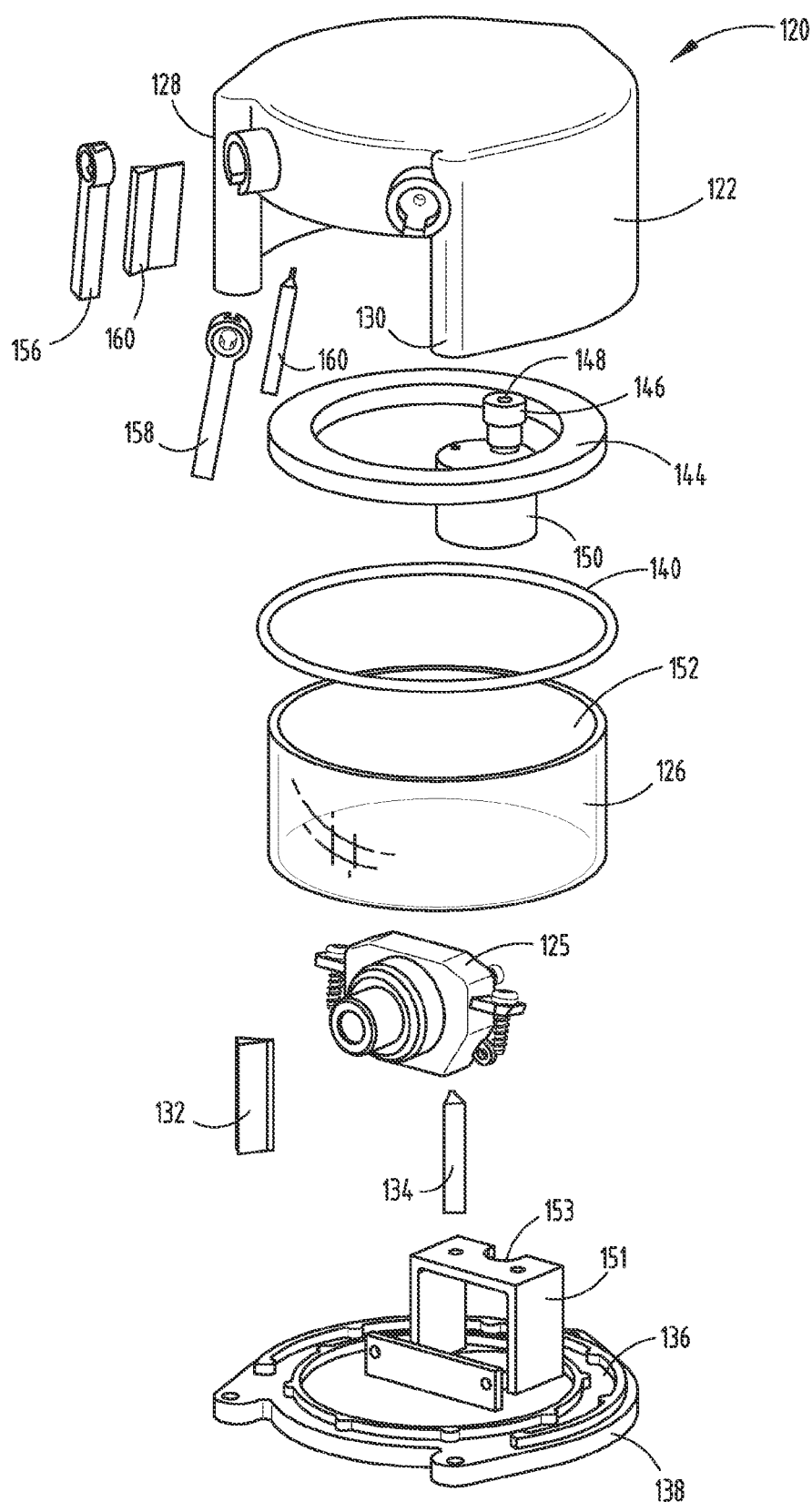
FIG. 9 is a top perspective exploded view of the lens cleaning device of FIG. 7.

Yet another embodiment is illustrated in FIGS. 7-9. A lens cleaning device 120 includes a housing 122 with a forward opening 124 configured to provide a viewing window for an imager 125. The viewing window also accommodates a cylindrical lens 126 of the lens cleaning device 120. The housing 122 includes first and second forward projections 128, 130 adapted to receive and protect first and second wiping members 132, 134 that are disposed on either side of the forward opening 124 of the housing 122. The cylindrical lens 126 is supported inside a circular slot 136 in a base 138 of the lens cleaning device 120. The circular slot 136 allows for rotation of the cylindrical lens 126 inside the housing 122. A gasket 140 seals an assembly space 142 defined by the housing 122 from the environment. An open gear 144 is positioned above the gasket 140 and is operably coupled with the cylindrical lens 126. The open gear 144 is connected with a drive gear 146 that is fixedly connected with a drive shaft 148 that extends into a motor 150. The motor 150 is operable between activated and deactivated conditions, which can be selected by a user, or automatically initiated by certain predefined criteria. The imager 125 and the motor 150 are disposed inside a cavity 152 defined by the cylindrical lens 126. The motor 150 is positioned in an enclosure 151 with a slot 153. The imager 125 is designed to capture images through the forward opening 124 and cylindrical lens 126. The motor 150 operates in a similar condition to the previous embodiment such that engagement of the motor 150 causes the cylindrical lens 126 to rotate and disengagement of the motor 150 causes the cylindrical lens 126 to stop. In addition to the first and second wiping members 132, 134 that are disposed inside the housing 122, there are also third and fourth external wiping members 156, 158 that remove dirt and debris from the cylindrical lens 126. The external wiping members 156, 158 each have a polymeric member 160 such that they act as a "squeegee" to remove fluid particles. The external wiping members 156, 158 are set at an angle to assist in the removal of debris from the cylindrical lens 126. The first and second wiping members 132, 134 include felt members that remove dust and other solids from the cylindrical lens 126.

Figure 10:
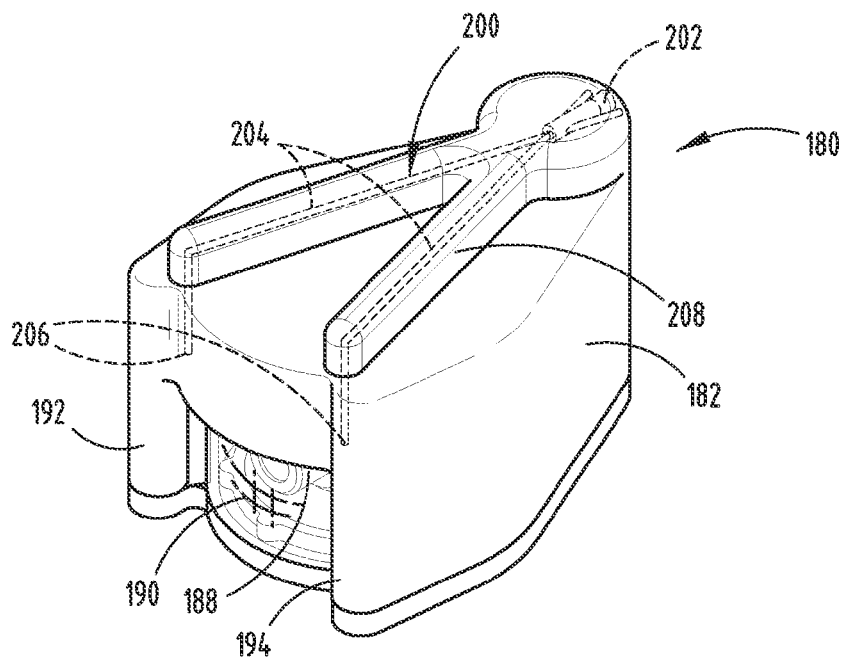
FIG. 10 is a top perspective view of an embodiment of a lens cleaning device having a fluid cleaner.
Figure 11:
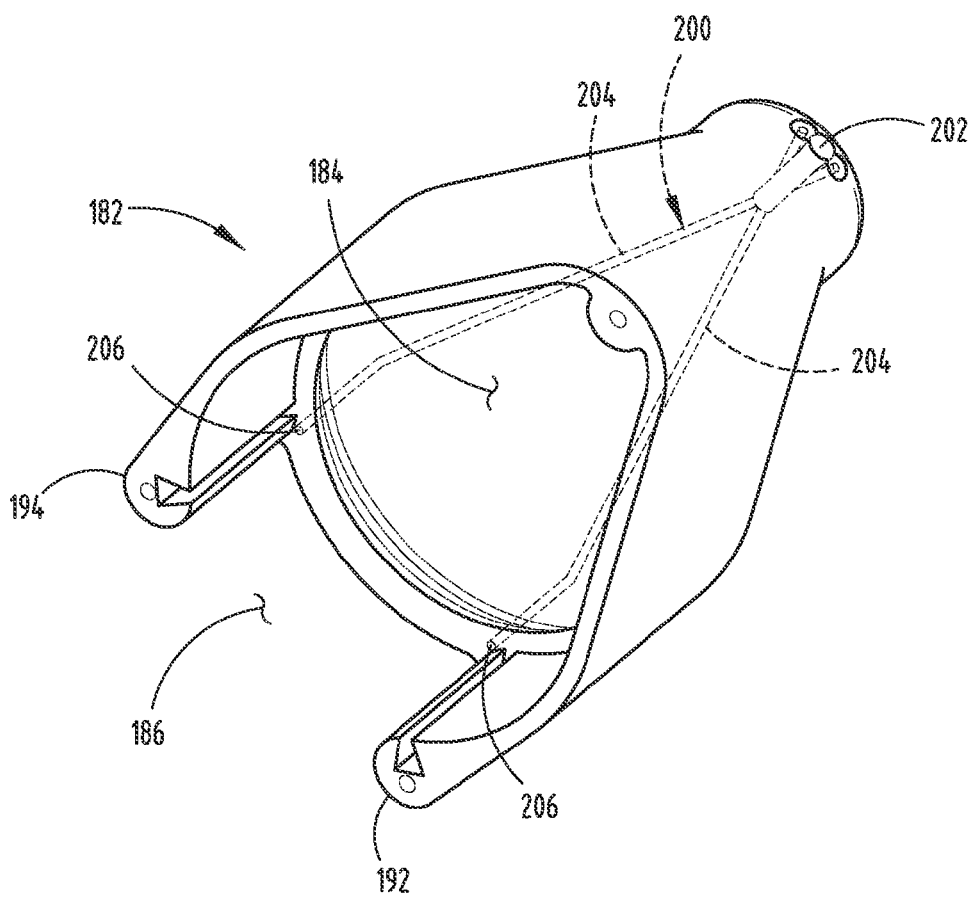
FIG. 11 is a bottom perspective view of a housing as used in the embodiment of the lens cleaning device shown in FIG. 10.

Referring to FIGS. 10-11, in another embodiment of the present invention, a lens cleaning device 180 includes a housing 182 that generally defines an assembly space 184 and a forward opening 186 configured to provide a viewing window for an imager 188. The viewing window is also configured to generally accommodate a forward portion of a cylindrical lens 190 of the lens cleaning device 180. The housing 182 includes first and second forward protuberances 192, 194 adapted to receive and protect first and second wiping members (as shown in previous embodiments) that are disposed on either side of the viewing window of the housing 182. The imager 188 is configured to capture images and video through the forward opening 186 and the cylindrical lens 190.

The lens cleaning device 180 depicted in FIGS. 10-11 further includes a fluid delivery system 200, having a fluid inlet 202, fluid delivery lines 204 and fluid dispensers 206, to dispense a cleaning fluid onto the cylindrical lens 190. Cleaning fluid can be supplied to the fluid delivery system 200 from an existing windshield washer system or from a separate reservoir (not shown). The fluid delivery system 200 can also be logically tied to the windshield washer system for the vehicle, or can be separately operable by the user or based on sensor input. The fluid is supplied to the fluid inlet 202, and then flows through the fluid delivery lines 204 to the fluid dispensers 206. To accommodate the fluid delivery lines 204 within the housing 192, the housing 192 may include raised portions 208. Each fluid dispenser 206 includes a nozzle, valve or other dispensing mechanism to dispense the fluid onto the surface of the cylindrical lens 190. The fluid dispensers 206 in the embodiment depicted in FIGS. 10-11 are located adjacent the protuberances 192, 194 in the housing 182, to apply the fluid to the lens 190 and aid the wiping members in removing dirt from the lens 190. Alternate embodiments may include a different number of fluid dispensers 206, from a single dispenser 206 to a plurality of dispensers arranged adjacent the lens 190. In use, cleaning fluid is supplied to the fluid inlet 202, flows through the fluid delivery lines 204, and is dispensed to the surface of the lens 190. The lens 190 is then rotated, allowing the wiping members to remove the cleaning fluid and dirt that has accumulated on the lens 190.

The present concept includes a lens apparatus that protects and seals an imager, and is self-cleaning during use. The lens apparatus as described herein allows the imager to continue to capture clear images despite the presence of adverse environmental conditions including dust or moisture which would normally be detrimental to an imager or to the collection of clear images. Thus, the lens apparatus allows the imager to be effectively used in outdoor and mobile applications, such as on a vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lens cleaning device, comprising:
   a housing, wherein the housing includes at least one forward projection extending in a direction parallel with an optical axis and supporting a wiping member;
   a cylindrical lens disposed inside the housing and defining an inner cavity;
   an imager disposed in the cavity;
   a gear assembly operably coupling the cylindrical lens with a motor, wherein the motor is operational to rotate the gear assembly and consequently the cylindrical lens;
   wherein the gear assembly includes a drive gear fixedly connected to a drive shaft of the motor and operably coupled to a planetary gear, wherein the planetary gear is operably coupled to the cylindrical lens; and
   a gasket disposed between the cylindrical lens and the planetary gear to seal the inner cavity.

2. The lens cleaning device of claim 1, wherein the motor is disposed inside the inner cavity.

3. The lens cleaning device of claim 1, wherein the housing defines a viewing window for the imager and wherein the housing comprises a projection adapted to receive and protect the wiping member.

4. The lens cleaning device of claim 3, wherein the wiping member is in abutting contact with an outer surface of the cylindrical lens.

5. The lens cleaning device of claim 4, wherein the wiping member includes a lens contact portion, and the lens contact portion is at least partially a felt material.

6. The lens cleaning device of claim 1, further comprising:
   a fluid dispenser system which includes a fluid outlet to dispense a washer fluid onto the cylindrical lens.

7. A rotating lens apparatus, comprising:
a housing, wherein the housing comprises:
- a first projection defined by the housing and extending in a direction parallel with an optical axis, the first projection supporting a first inner wiping member; and
- a second projection defined by the housing and extending in a direction parallel with the optical axis, the second projection supporting a second inner wiping member;

a lens disposed inside the housing and having a cylindrical wall defining an inner cavity;
an imager disposed in the inner cavity and including a field of view that extends through the cylindrical wall of the lens;
a wiping assembly in contact with an outer circumference of the lens, the wiping assembly comprising:
- a first external wiping member disposed on a first side of the field of view;
- a second external wiping member disposed on a second side of the field of view;
- wherein the first and second external wiping members are disposed on opposite sides of the external surface of the lens;

a gear assembly operably coupling the lens with a motor, wherein the motor is operational to rotate the gear assembly and consequently the lens; and
wherein the gear assembly includes a drive gear fixedly connected to a drive shaft of the motor and operably coupled to a planetary gear, wherein the planetary gear is operably coupled with and configured to rotate the lens.

8. The rotating lens apparatus of claim 7, wherein the first inner wiping member and second inner wiping member each include a lens contact portion, and wherein the lens contact portions are at least partially a felt material.

9. The rotating lens apparatus of claim 7, wherein the inner wiping members each include a felt member which is in contact with the lens.

10. The rotating lens apparatus of claim 7, further comprising a fluid delivery system to apply washing fluid to the lens.

11. The rotating lens apparatus of claim 10, wherein the first inner wiping member and second inner wiping member are at least partially a felt material.

12. A lens cleaning device, comprising:
a housing having side walls defining a window;
a lens disposed inside the housing proximate the window and having a cylindrical wall defining an inner cavity;
an imager disposed in the inner cavity and including a field of view that extends through the cylindrical wall of the lens;
a first wiping assembly in contact with an outer circumference of the lens;
a second wiping assembly in contact with an outer circumference of the lens comprising:
- a first external wiping member disposed on a first side of the field of view;
- a second external wiping member disposed on a second side of the field of view
- wherein the intersection of each of the first and second external wiping members with respective inner surfaces of the side walls of the housing define non-zero acute angles;

a gear assembly operably coupling the lens with a motor, wherein the motor is operational to rotate the gear assembly and consequently the lens;
wherein the gear assembly includes a drive gear fixedly connected to a drive shaft of the motor and operably coupled to a planetary gear, wherein the planetary gear is operably coupled to the lens; and
a fluid delivery system to deliver a washing fluid to the lens.

13. The lens cleaning device of claim 12, wherein the first wiping assembly includes at least one wiping member with a felt material in contact with the cylindrical wall and wherein the second wiping assembly includes at least one wiping member with a polymeric material in contact with the cylindrical wall.

* * * * *